Feb. 8, 1966  S. E. M. NORLINDH  3,233,445
ROLL MOUNTING IN FOUR-HIGH MILLS AND THE LIKE
Filed March 4, 1963  4 Sheets-Sheet 3

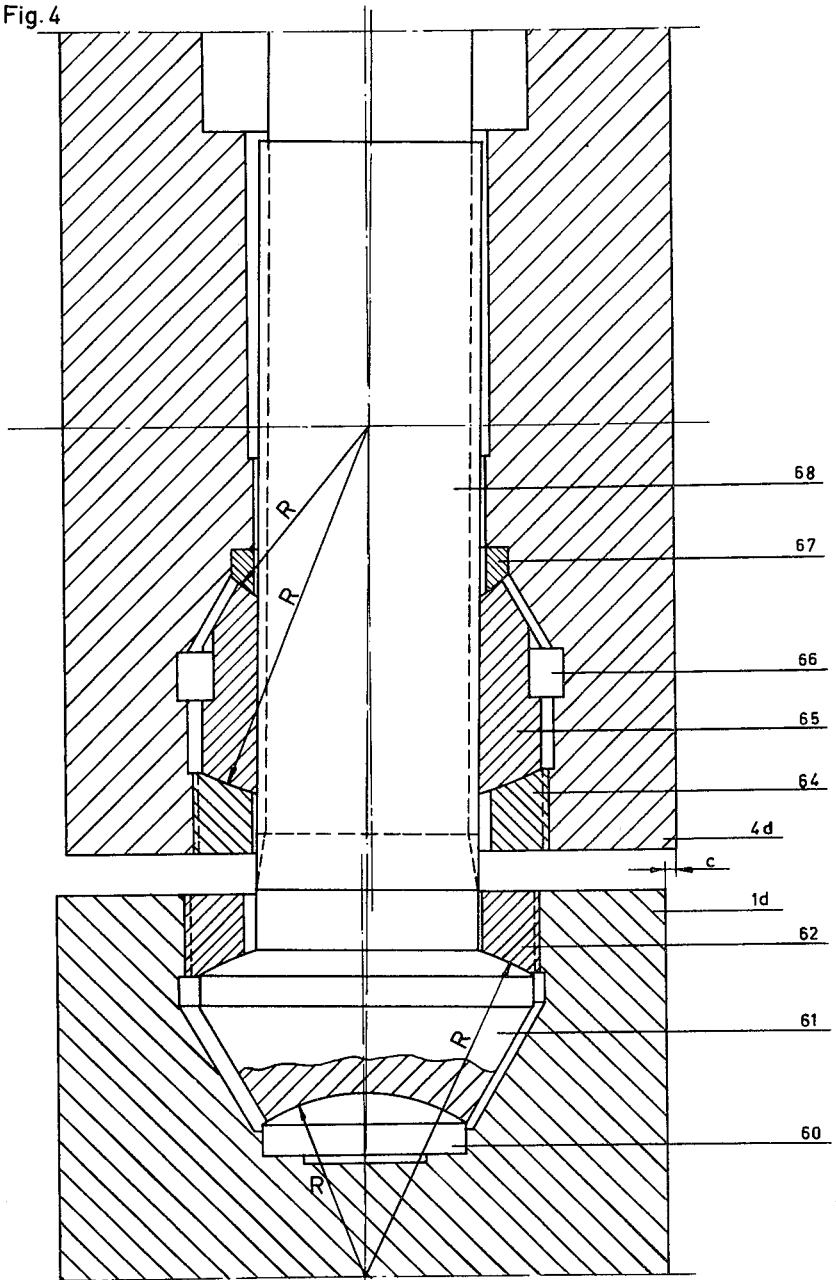

3,233,445
ROLL MOUNTING IN FOUR-HIGH MILLS
AND THE LIKE
Sven Erik Malte Norlindh, Morgardshammar, Sweden, assignor to Morgardshammars Mek. Verkstads Aktiebolag, Morgardshammar, Sweden, a Swedish joint-stock company
Filed Mar. 4, 1963, Ser. No. 262,622
Claims priority, application Sweden, Mar. 8, 1962, 2,576/62
1 Claim. (Cl. 72—240)

In four-high mills it has proved particularly difficult to achieve a satisfactory solution of the problem of how to mount the rolls without employing conventional mill stands. The said difficulties were due partly to the high rolling pressure in relation to the roll diameter and partly to the requirement for small "springing."

The invention relates to the mounting of rolls in rolling mills equipped with backing rolls and is characterized in that the bearing casings of the backing rolls enclose and guide the bearing casings of the work rolls, that short adjusting screws are provided on both sides of the bearing casings for transferring the rolling pressure directly from the extended portion of one backing roll bearing casing to the extended portion of the other backing roll bearing casing.

Figure 1:
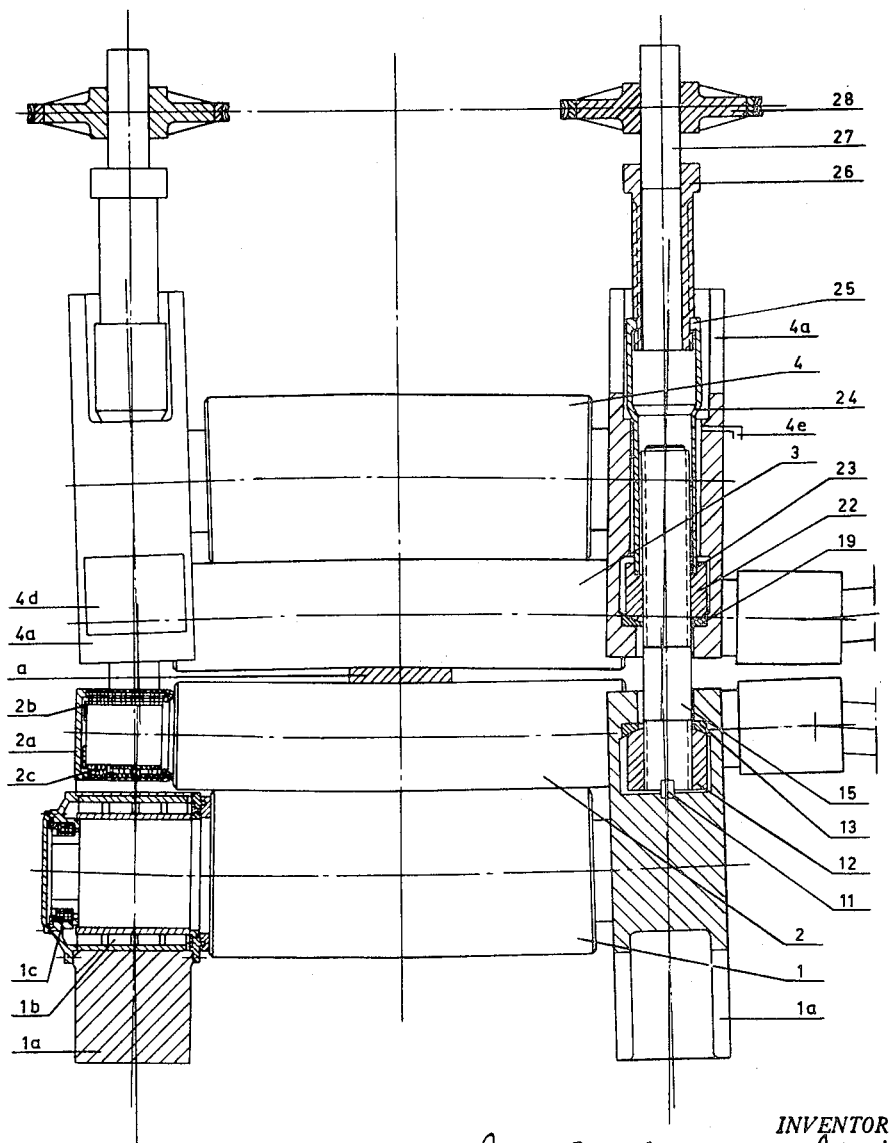
Figure 2:
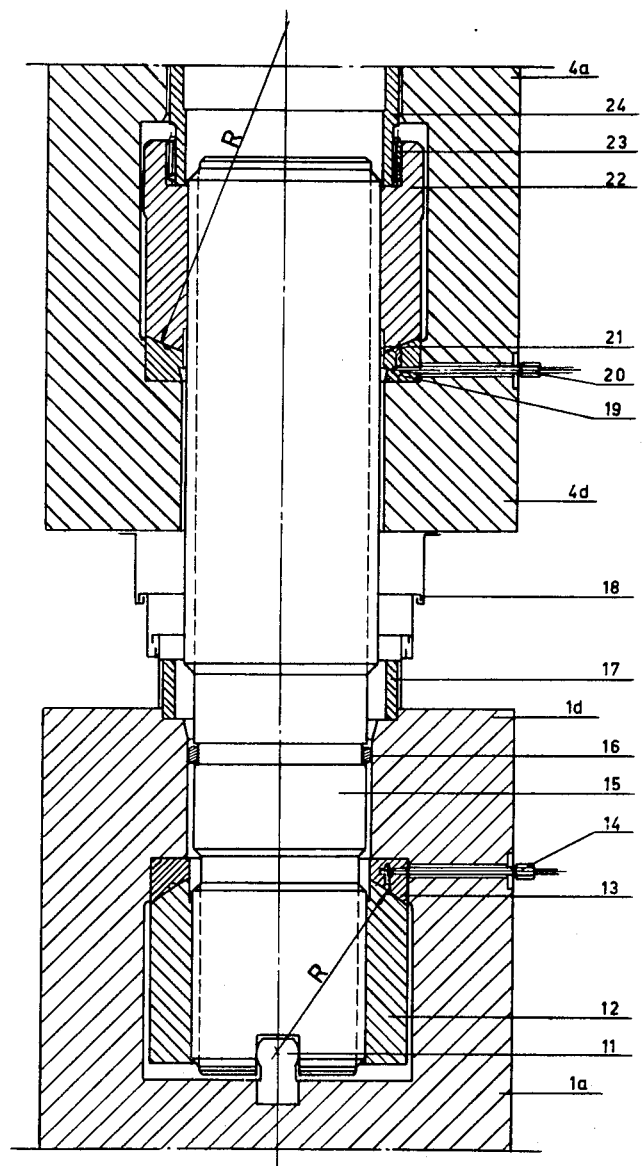
Figure 3:
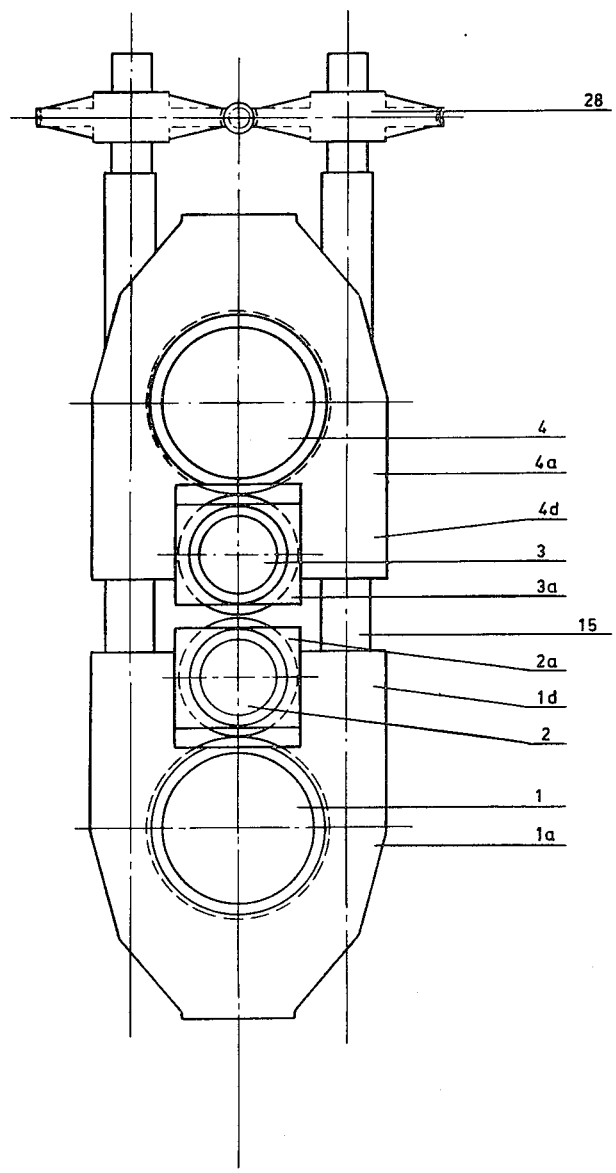

The invention is illustrated in FIGS. 1, 2 and 3 showing mills provided with rotary nuts and axially fixed adjusting screws, while FIG. 4 shows rotary adjusting screws and axially fixed nuts.

FIG. 1 shows a side view of a roll mounting in a four-roller mill, the backing rolls 1 and 4 mounted in cylindrical roller bearings 1b and 1c in the backing roll bearing casings 1a and 4a, 1a being shown in section at the bottom left.

The work rolls 2 and 3 rest against the backing rolls and are guided in rolling by cylindrical roller bearings 2b on the extended portion 1d of the backing roll bearing casings 1a in FIG. 3 and in the axial direction by thrust bearings 2c.

The right-hand bearing casing portion shows a section through the adjusting screws, and FIG. 2 shows the same section on an enlarged scale. FIG. 3 shows an end view of the four-high roll pair, from which it can be seen that the rolling pressure is transferred from the extended portion 1d of the lower backing roll bearing casing 1a to an adjusting screw 15 on each side of the bearings of the rolls to the extended portion 4d of the upper backing roll bearing casing 4a.

The two adjusting screws 15 have synchronized setting and are driven by an adjusting screw gear 28.

The backing roll bearing casings 1a and 4a, FIG. 3, have extended portions 1d and 4d to enclose the bearing casings 2a and 3a respectively of the work rolls, in such a manner that the extended portions 1d and 4d provide guidance for the bearing casings 2a and 3a respectively of the work rolls and that at the same time the adjusting screws 15 can be made short. As a result thereof, the "springing" against the rolling pressure in the adjusting screws is small and the forces are transferred to the large areas in the extended portions 1d and 4d of the backing roll bearing casing which, in view of small loads, spring less per unit of length than the adjusting screws.

Referring to FIG. 2, 11 designates a key, seen in endwise position in this figure and in FIGURE 1, extends across the end face of screw 15, which latter has a transverse keyway cut across its end face. Likewise, a keyway is cut in the bottom of roll bearing casing 1a, this latter keyway accommodating the lower portion of key 11. The major dimension of key 11 and of said keyways extends perpendicularly to the plane of FIGURES 1 and 2. By reason of this relationship key 11 prevents rotation of the adjusting screw 15 and a lower nut 12. Adjusting screw 15 is coupled to nut 12 and to nut 22 by mating threads which are indicated in FIGS. 1 and 2 by dashed lines parallel to the inner faces of said nuts. Similarly, in FIG. 4 dashed lines parallel to the inner face of nut 65 indicate that said nut 65 and screw 68 are coupled together by mating threads. The nut 12 rests with its spherical surface having the radius R against a washer 13 shrunk into the extended portion 1d of the bearing casing 1a, thereby transferring the rolling pressure of the material a in FIG. 1 by perfect surface abutment from the bearing casing 1a to the nut 12. Due to the spherical transferring surfaces the surface abutment can be maintained even when there are variations in the rolling pressure, as shown in FIG. 1, without subjecting the bearings 1b to edge loads. The springing against the rolling pressure can be kept at a minimum, in view of the absence of the considerable springing caused by point and line contacts, as is the case in the present applicant's U.S. patent specification 2,506,681, FIG. 1 (abutment between 13 and 14).

When desired, the friction in the spherical surfaces can be reduced by supplying high-pressure oil through tube 14, FIG. 2.

The details 16, 17 and 18 are packings preventing water and impurities from entering into the adjusting screw equipment.

The spherical surface R of the adjusting screw 22 and the washer 19 shrunk into the extended portion 4d of the bearing casing 4a with the associated high-pressure oil supply tube 20 transfer the rolling pressure from the adjusting screw 15 to the upper backing roll bearing casing 4a. Due to the fact that the the washer 19 is shrunk into the bearing casing the washer is as precisely formed as if the spherical surface were formed directly in the bearing casing.

For setting the roll pass, the adjusting nut 22 is rotated by splines 23 and 25 in the sleeve 24 from the adjusting screw equipment 26, 27 and 28, FIGS. 1 and 2. The spline transfer 23 and 25 is constructed such that the adjusting screw gear 28 and the adjusting nuts 22 can freely assume the angular positions which are required with respect to the deflection of the rolls caused by varying rolling pressure, as it is exaggeratedly shown in FIG. 1. FIG. 1 shows an oil discharge hole 4e, and FIG. 2 shows an oil seal 21 between the threads of adjusting nut 22 and of adjusting screw 15, thus rendering possible perfect lubrication of the threads by circulating oil. The opening for mounting the adjusting nut 22 and washer 19 is closed by a cap 4d. The spherical washers 13, 19 in FIG. 2 may also be screwed into the extended portions 1d, 4d of the bearing casings, as shown in FIG. 4. In this embodiment, the adjusting screws are rotated for setting the roll pass. The adjusting screws 68 are provided with a head 61 anchored in the extended portion 1d of the backing roll bearing casing by means of a washer 62 threaded in such manner that there is spherical abutment against the head 61 of the adjusting screw. When desired, the head 61 may with its lower part be supported on a spherical washer 60 in the backing roll bearing casing and thereby maintain the upper backing roll 4 in lifted position.

The nut 65 is anchored by similar washers 64 and 67 respectively in the extended portion 4d of the upper backing roll bearing casing and is prevented from rotation by key means 66.

From a theoretical point of view, there is no objection to give the contact surfaces between the nut 65 and washers 64 and 67 cylindrical shape, the axis of the cylinder extending in parallel with the direction of the material to be rolled.

It was only by the combination of the aforesaid fundamental construction principles, that a fully satisfactory solution of the problem was achieved. The backing roll bearing casings 1a and 4a, FIG. 3, are extended on both sides of the work roll bearing casings 2a and 3a, in such a manner that the upper and lower backing roll bearing casings at the smallest roll diameters leave space only for packings 17, 18 about the adjusting screws 15, FIG. 2, mounted in the extended portion 1d, 4d of the backing roll bearing casings 1a, 4a. The extended portions of the backing roll bearing casings serve at the same time as guides in the longitudinal and lateral direction of the bearing casings 2a, 3a of the work rolls. The construction of the adjusting screws for transferring the rolling pressure directly from one backing roll bearing casing to the other created particular problems, in view of the fact, that the backing rolls had to be mounted in rigid bearings, for example cylindrical slide bearings or multiple-row roller bearings requiring a fully satisfactory possibility for the backing roll bearing casings to adjust to the inclination of the backing roll necks due to varying loads. This requirement had to be met on a limited space with perfect surface abutment of all rolling pressure transferring surfaces.

In view of the considerable sprining caused when the rolling pressure is transferred by point and line surfaces, it was important to replace them by spherical surfaces adapted for self-adjustment with required angles while maintaining perfect surface abutment of such a magnitude that the surface pressure is moderate and does not damage the surfaces during operation.

The fastening of the roll mounting is not shown and does not constitute a part of this patent application.

Subject matter similar to the foregoing is disclosed in my co-pending patent application Serial No. 262,682.

What I claim is:

A roll mounting for a rolling mill having a pair of work rolls between spaced backing rolls; bearing casings for the work rolls and bearing casings for the backing rolls, the bearing casings of the backing rolls being lengthened to enclose and guide the bearing casings of the work rolls, and short adjusting screws on both sides of the bearing casings of the work rolls for transferring the rolling pressure directly from the extended portion of one backing roll bearing casing to the extended portion of the other backing roll bearing casing, said adjusting screws having pressure transferring surfaces with rounded end portions and complementary rounded abutting surfaces formed in said roll bearing casings whereby the relative angular positions between said adjusting screws and their respective casings are adjustable during rolling at various loads.

References Cited by the Examiner

UNITED STATES PATENTS

| 1,796,447 | 3/1931 | Foren | 80—55 X |
| 2,042,872 | 6/1936 | Talbot | 80—55.1 |
| 2,294,970 | 9/1942 | Fagerstrom et al. | 80—55 |
| 2,506,681 | 5/1950 | Norlindh | 80—55.1 X |

FOREIGN PATENTS

| 931,344 | 8/1955 | Germany. |

CHARLES W. LANHAM, *Primary Examiner.*

WILLIAM J. STEPHENSON, *Examiner.*

C. H. HITTSON, *Assistant Examiner.*